(12) United States Patent
Eidelberg

(10) Patent No.: US 8,104,752 B2
(45) Date of Patent: Jan. 31, 2012

(54) INTEGRATED LARGE XY ROTARY POSITIONING TABLE WITH VIRTUAL CENTER OF ROTATION

(76) Inventor: Boaz Eidelberg, Commack, NY (US)

( * ) Notice: Subject to any disclaimer, the term of this patent is extended or adjusted under 35 U.S.C. 154(b) by 1343 days.

(21) Appl. No.: 11/712,599

(22) Filed: Feb. 28, 2007

(65) Prior Publication Data

US 2007/0216892 A1 Sep. 20, 2007

Related U.S. Application Data

(60) Provisional application No. 60/784,048, filed on Mar. 20, 2006.

(51) Int. Cl.
*B23Q 3/18* (2006.01)
*A47B 11/00* (2006.01)

(52) U.S. Cl. ............... 269/60; 108/140; 108/143

(58) Field of Classification Search .............. 269/60, 269/55, 56, 57; 74/490.08; 33/1 M; 310/12.06; 108/20, 140, 143
See application file for complete search history.

(56) References Cited

U.S. PATENT DOCUMENTS

| | | | | |
|---|---|---|---|---|
| 2,994,526 A * | 8/1961 | Clawson | ............... | 269/69 |
| 4,392,642 A * | 7/1983 | Chitayat | ............... | 269/73 |
| 4,429,267 A * | 1/1984 | Veale | ............... | 318/594 |
| 4,648,724 A * | 3/1987 | Sugiyama et al. | ............... | 384/9 |
| 4,768,698 A * | 9/1988 | Brown et al. | ............... | 228/18 |
| 4,896,869 A * | 1/1990 | Takekoshi | ............... | 269/60 |
| 5,465,496 A * | 11/1995 | Axon | ............... | 33/522 |
| 5,523,941 A * | 6/1996 | Burton et al. | ............... | 700/60 |
| 5,724,893 A * | 3/1998 | Lee et al. | ............... | 108/20 |
| 5,760,564 A * | 6/1998 | Novak | ............... | 318/687 |
| 6,196,138 B1 * | 3/2001 | Sakai et al. | ............... | 108/22 |
| 6,327,929 B1 * | 12/2001 | Yanagisawa | ............... | 74/490.09 |
| 6,635,887 B2 * | 10/2003 | Kwan et al. | ............... | 250/491.1 |
| 6,771,372 B1 * | 8/2004 | Traber | ............... | 356/399 |
| 6,852,989 B2 * | 2/2005 | Kwan et al. | ............... | 250/491.1 |
| 7,707,907 B2 * | 5/2010 | Bonev | ............... | 74/490.08 |
| 2004/0177520 A1 * | 9/2004 | Nakamura et al. | ............... | 33/1 M |
| 2004/0187743 A1 * | 9/2004 | Kanehira | ............... | 108/20 |
| 2007/0119347 A1 * | 5/2007 | Yamazaki et al. | ............... | 108/20 |
| 2007/0216892 A1 * | 9/2007 | Eidelberg | ............... | 355/72 |
| 2009/0152785 A1 * | 6/2009 | Komiya et al. | ............... | 269/63 |
| 2010/0253275 A1 * | 10/2010 | Gajjar | ............... | 318/601 |
| 2010/0313695 A1 * | 12/2010 | Valasek | ............... | 74/490.08 |

* cited by examiner

*Primary Examiner* — Lee D Wilson
*Assistant Examiner* — Jamal Daniel
(74) *Attorney, Agent, or Firm* — Thomas A. O'Rourke; Budner & O'Rourke, LLP

(57) ABSTRACT

A unique X, Y, θ (Rotary) positioning system is disclosed that may include a machine base assembly with a substrate slide moving on the machine base with either a recirculating or air bearing in Y direction and two integrated cross stages attached to the slide which can kinetically provide large movements of the slide relative to the base in the X direction as well as generating large motion of the slide in the rotary θ direction about a virtual center of rotation. The positioning system allows a user to position large format glass substrates and the like with precision control. Specifically, depending on the mounting configuration of the present invention, a user may correct for straightness in X, X' and Y directions, yaw in the A rotation direction and position in the X, X' and Y direction.

30 Claims, 14 Drawing Sheets

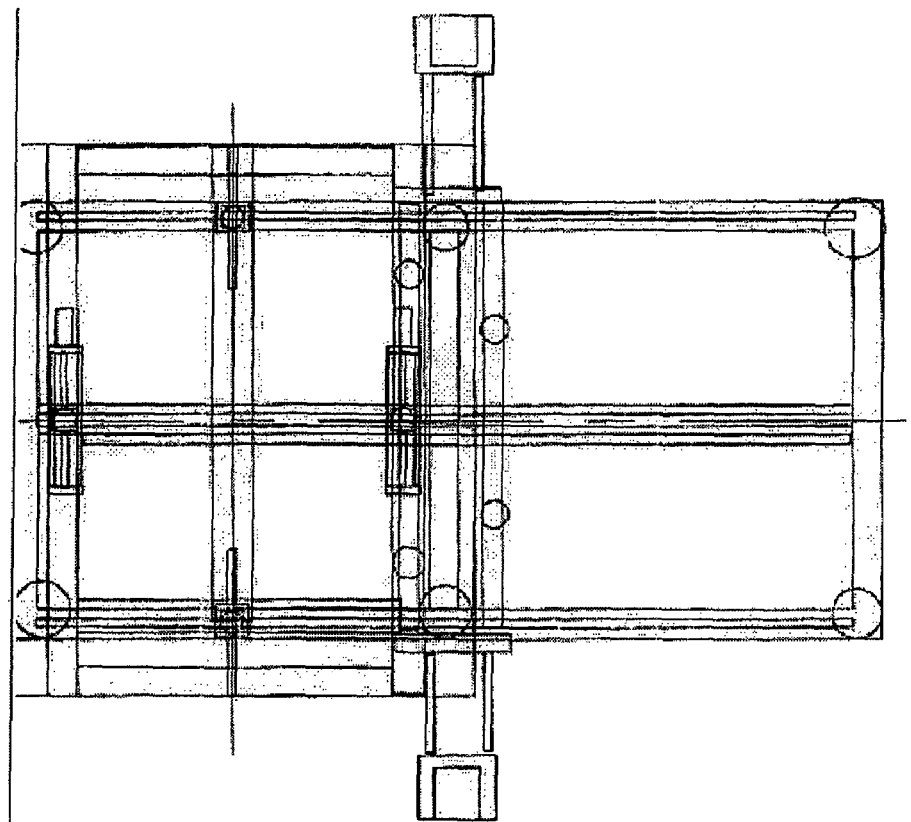
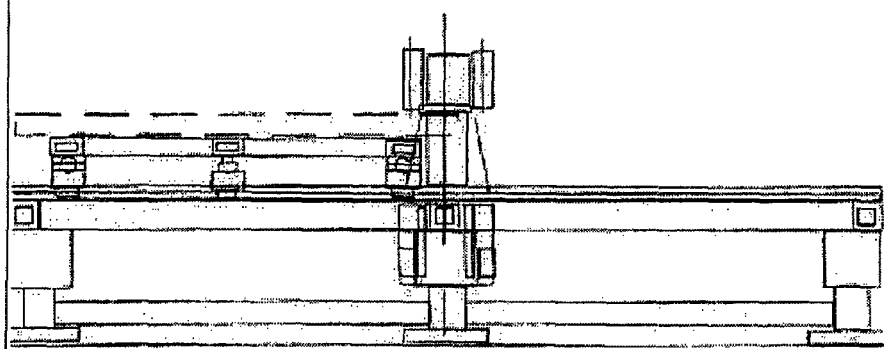
FIG. 9B
FIG. 9A

INTEGRATED LARGE XY ROTARY POSITIONING TABLE WITH VIRTUAL CENTER OF ROTATION

The present application claims priority on U.S. Provisional Patent Application Ser. No. 60/784,048 filed Mar. 20, 2006, the disclosures of which are incorporated herein by reference

FIELD OF INVENTION

The present invention relates to a positioning system, which may be used with for example, large flat substrates, including but not limited to large format glass substrates. The large format glass substrates included in the present invention are typically used in applications associated with printing, scribing and inspecting solar panels and flat panel displays. In addition the present invention may be used for semiconductor production and various other automation applications which require X, Y ⊖ (Rotary) positioning systems.

BACKGROUND OF THE INVENTION

The present invention is a unique positioning system that may be used with many processes that require precision X, Y, ⊖ movement, i.e. stage travels, in the range of up to X 1,000 millimeters, Y 5000 millimeters and ⊖45 degrees The utility of the present invention, is particularly relevant to, for example, large format substrate process tools. In another example, one may also use the positioning system in connection with printing as well as other precision production processes such as laser scribing, glue dispensing, biotechnology assaying, machining and testing. Whether one is using the positioning system for printing on large format glass substrates, assembling flat panel displays, semiconductor or other precision production process, the need for precise X, Y, ⊖ movement of the positioning system substrate is most critical, in particular where one process tool continues the work done by another tool and alignment of incoming substrate with respect to the tools is critical. For example, one tool may scribe solar panel lines and the other tool may then scribe another set of lines parallel and in close proximity to the first set of lines which are already existing on the panel. Or in another example, one tool may places small droplets of disease DNA samples on a Biochip substrate, another tool may place drug targets on top of the DNA samples and yet another tool senses the chemical reaction between the samples.

The precise movement needed during the fabrication process is made even more challenging because of the sheer size of the large substrates and the large staging required to move them. One example may be seen with tenth generation panels (3,000 by 3,000 millimeters), used for flat panel displays, which can require stage travels up to 4,000 millimeters, while typical moving chucks can weigh up to 500 kilograms. The mass and inertia of such positioning systems are a challenge for the devices that control and drive the stage. For the most stringent processes, the motion of the panel must be controlled with sub micron translational error in X, Y, Z direction. Minimizing rotational errors (pitch, yaw and roll) is particularly critical, as small rotations can result in large translations in the X, Y, and/or Z planes located at the edge of the panel. One component of the flat panel display process machines that may provide precise smoothness, flat and straight, movement is the air bearing stage. Air bearings are generally used because they allow precise, repeatable motion. However straightness and flatness of motion errors of more than 10 microns and 2 arc seconds can be expected with air bearings in large travel of 4,000 mm. Although these motion errors initially seem negligible, they generally are not acceptable for certain flat panel processes.

As mentioned above, the positioning system of the present invention may also be used with printing, scribing and inspection of large format glass substrates. Generally, the positioning system of the present invention is used to process large format glass substrates that require the use of mechanical systems, which may include a multitude of subassemblies. One such positioning system configuration may include: precision granite base with one or more air bearing slides moving on the base in X, Y, ⊖ direction, precision granite bridge beams with integrated risers mounted to the base where tools are mounted to, and steel weldment for connecting the granite base to the floor with vibration isolation mounts. Other lower cost positioning system configurations may include: a flat steel or aluminum base with recirculating bearing slide moving on the base in X, Y, ⊖ directions, aluminum or steel beam mounted on risers to the base, and steel weldment for mounting the base to the floor with or without isolation mounts. In either configuration, typically non-contact linear motors and non-contact optical encoders are needed to provide precise, repeatable X-Y motion. It will be appreciated by those skilled in the art that these two types of positioning systems with air bearings or recirculating bearings are just two of many mechanical system components that may be used for printing, inspecting or positioning of large format glass substrates. Whether one uses one of the mechanical systems similar to those just discussed or another type of mechanical system, there remains the need to position the large format glass substrates and correct for any errors associated with such positioning in X, Y, ⊖ direction. One may correct the error associated with the movement of large format glass substrates with a variety of different methods. For example, error can be corrected by external sensing devices such as cameras or laser interferometers. They can also be corrected by mapping the errors. The present invention allows for correcting the errors in the X, Y and ⊖ directions including position, straightness and yaw of large flat panels using mapping, as well as using cameras to correct for large substrate misalignment. In particular, the invention addresses the need of making large integrated X, Y and ⊖ Rotational motion for positioning large substrates in process machines, including large corrections in X, Y, ⊖ for the initial substrate or glass alignment, as well as providing an integrated mechanism for making small corrections of straightness and yaw during process motion.

Flat panel display manufacturing, printing, scribing and inspection on large format glass substrates, semiconductor fabrication and numerous other manufacturing processes all have one thing in common, they require precision motion control for feature generation and inspection. There is a present need for a positioning system, for large substrates, that may allow for long Y displacement to be simultaneously corrected during process motion, for both accuracy in the Y direction, correction of straightness errors in the X direction, and ⊖ rotational errors of yaw in the XY plane. In addition, there is a need for a positioning system that will have the kinematic flexibility for producing the required ⊖ alignment of large panel substrates as well as the requirement to generate large X and Y displacement of the stages.

It should be noted that in the foregoing description and elsewhere herein Y designates the longitudinal axis of motion of the substrate in absolute coordinate system, fixed to the machine base. X designates the transverse axis of motion of the substrate in absolute coordinate system perpendicular to Y and fixed to the machine base. θ represents a rotational axis of motion of the substrate in the XY plane. The moving coordinates, which are fixed to the substrate are designated as X', Y'. The substrate motion can be expressed in either X'Y' coordinate system or XY coordinate system using trigonometric transformation equations as shown in the Appendix It should further be noted, as shown in the Appendix mathematical formulation of the invention, which are an integral part of the invention, that there are forward kinematic equations and inverse kinematic transformations. The forward kinematic transform moving X1, X2, Y machine controlled axes to angle θ of the substrate and an X, Y position of any point on the Substrate in the machine fixed coordinate system.

Similarly in the inverse Kinematic equations, as shown in the Appendix, the position of X1, X2, Y axes of the mechanism are determined to position a known point Q on the substrate at a known point P on the machine with a desired angular orientation of the substrate. These trigonometric transformations, relate to dimensions and motion from the moving X'Y' coordinate system to the fixed XY coordinate system and vice versa. In the following description references will be made to either coordinate system It should further be noted that the following terms will be used in the foregoing discussions:

Linear Rail—a long linear bearing which is fixed to a base or a moving slide

Puck—a small slide that has a degree of freedom moving along its rail

Motorized Rail—One or two parallel Linear rails each having one or two pucks, where the rails are attached to a fixed base and the pucks are attached to a moving slide and the motion between the slide and the base is achieved by an actuator such as linear motor or a ball screw.

Positioning Stage—A device, including, motorized rails with feedback devices such as linear or rotary encoders, sometimes referred to as Positioning Table.

Positioning System—A positioning device that includes of one or more positioning stages mounted in a certain configuration, such as compounded, split axes or Gantry, and controlled by motion controller with servo amplifiers.

Positioning System Components—Components that make up the positioning system including for example rails, motors, actuators, slides, bases, encoders, cables, controllers, amplifiers and vibration isolation mounts Compounded Positioning System—A positioning system where the positioning stages are mounted one on top of the other Integrated Positioning System—A positioning System where the same components are used to generate motion in more than one direction. Integrated positioning systems are typically of lower cost, more compact, more accurate and more robust yet their assembly must be precisely controlled.

Virtual center of rotation—A point about which the slide of the machine rotates which is not a fixed point on the slide.

Revolute joint—A rotary bearing connecting the slides of two positioning stages.

OBJECTS OF INVENTION

It is therefore an object of the present invention is to provide an integrated large x, Y, ⊖ positioning system with a virtual center of rotation for large format machines, It is still another object of the present invention to provide a X, Y, ⊖ positioning system with a virtual center of rotation for large format machines that use low cost structures.

It is another object of the present invention to provide a X, Y, ⊖ position system with virtual center of rotation for large format machines that use low cost bearings.

It is yet another object of the present invention to provide a X, Y, ⊖ positioning system with a virtual center of rotation for large format machines that has the ability to simultaneously correct for position errors in the XY direction of motion of large moving substrates including straightness and yaw errors for both the X and Y axes.

It is still another object of the present invention to provide a X, Y, ⊖ positioning system that can obtain an optimal virtual center of rotation to align a substrate.

These and other objects of the present invention will become apparent to those skilled in the art from a review from the description provided below.

SUMMARY OF INVENTION

The present invention implements a unique X, Y ⊖ (Rotary) positioning system that may include a machine base assembly with a substrate slide moving on the machine base with either a recirculating or air bearing in Y direction and two integrated cross stages attached to the slide which can kinematically provide large movements of the slide relative to the base in X direction as well as generating large motion of the slide in the rotary ⊖ direction about a virtual center of rotation. In all applications of the present invention the three degrees of freedom of the stage slide including X, Y and ⊖ are generated by three linear degrees of freedom, X1, X2, Y1, or Y1, Y2, X1 depending on the specific configuration, where X1, Y1, X2, Y2 are motorized rails, stages or tables integrated between the substrate slide and the machine base and connected to each other through, for example, revolute joints. In addition, to complete the application of the invention in a process machine, the present invention may include an additional separate bridge beam with risers mounted to the machine base and additional stages moving on the bridge. The bridge beam is made from granite, steel or aluminum as may be best needed for the process. Furthermore, the positioning system of the present invention may include at least one weldment, preferably made from steel, used for connecting the machine base to the floor and may include at least one vibration isolation mount. Other features that may be included in the present invention are a central driven actuator such as an ironless linear motor or ball screw driving the slide in the Y direction. The actuator type is selected for the required level of smoothness of motion along with a linear encoder on the side of the Y motor to provide high precision positioning and feedback of the long Y linear motion. In addition, the two cross X stages X1 and X2 are driven each by a linear motor or ball screw with linear encoder or rotary encoder feedback in what is commonly known by those who are familiar with the Art as Gantry configuration. When the two X cross stages X1, and X2 are commanded to move in the same direction a linear translation is generated to the slide in the X' direction. When the two stages are commanded to move in opposite direction the slide moves in the ⊖ rotary direction about a virtual center of rotation depending on the amount of travel of X1 X2 stages. The large ⊖ rotation is generated through a unique revolute joint mechanism which connects the slide of each X cross stage to the slide of Y linear bearing. One may also integrate, into the positioning system of the present invention, Gantry software for the two cross X stages X1 and X2 with encoder averaging to control the X linear motion and small Yaw corrections. The unique features of the present invention include therefore the mounting configuration of the two ball screw or linear motor cross X stages X1 and X2 to the linear Y guidance air bearing or recirculating bearing slides or pucks through rotary bearings (revolute joints). This unique mounting configuration provides large ⊖ rotation of the substrate slide about a virtual rotation center depending on the specific travel of each of the three motorized linear stages X1, X2 and Y. The other non motorized Y puck or pucks which support the substrate slide will be positioned freely along their Y rails. In addition, this unique mounting configuration allows for large X translational stages integrated within the Y stage. By implementing this unique integrated X, Y, ⊖ mounting configuration one may overcome the disadvantages of the other positioning systems which commonly compound individual X, Y, ⊖ stages one on top of the other. Compounded stages consume larger height and typically result in lower precision due to larger Abbe offset. By providing an integrated X, Y, ⊖ stage using three linear translational stages X1, X2, Y as described in this invention, the mechanism can provide both large X, Y linear translation with large ⊖ rotational positioning of the large slide which carries the substrate, as well as providing large yaw and X, Y straightness error correction at any X, Y, ⊖ position. Therefore high precision of motion of the slide can be achieved in X, Y and ⊖ rotation direction by mapping the errors in any one of these directions.

The present positioning system allows the user to position large format glass substrates and the like with precision control. Specifically, depending on the mounting configuration of the present invention the user may correct for straightness in X, X' and Y directions, yaw in the ⊖ rotation direction and position in the X, X' and Y direction. As shown by the mathematical formulation of this invention in the Appendix, any one axis of the three degrees of freedom slide motion X, Y, ⊖ (Rotary) can be therefore corrected in either machine base fixed XY coordinate system or in moving X'Y' coordinated system, fixed to the moving Substrate slide. This is achieved via a positioning system that implements at least one motor and encoder for the Y slide and for the two cross stages X1, X2.

One example of the utility of the present invention may be seen with flat panel display (FPD) or Solar Panel manufacturing process. Generally a large substrate, for example glass, is placed on the chuck surface, which in turn is mounted to the machine substrate slide. The large chuck is moved with the machine slide under process tools such as, for example, inspection cameras, print heads or scribing laser heads, that process the glass. Before the process begins it is typically required to align the glass with the process tools. It is therefore required to initially measure the orientation of the glass by a vision system A camera that is mounted on the machine fixed bridge detects the offset of marks on the glass (fiducials) from their required position. The user will then align the chuck on which the glass is mounted, via the three motorized linear positioning stages (i.e. one Y and two cross stages X1 and X2) of the present invention, as shown explicitly by the Inverse Kinematic formulation in the Appendix, to precisely correct for the initial large misalignment errors. The initial alignment of the substrate with large X, Y, θ corrections is most critical in manufacturing process of FPD's as well as large solar panels. This is accomplished by commanding the Y stages and the two cross motors X1, X2 to move the glass substrate large amounts in X, Y, θ directions. The user will then continue the process by moving the slide in Y direction and use the X1, X2 stages for any small corrections in the X direction (straightness) or θ direction (yaw) errors as the substrate moves during printing or the inspecting process in the Y direction. This is accomplished by commanding the two cross motors X1, X2 to move the glass substrate small amounts. As the three motors of Y and two X stages X1 and X2 are moving to their mapped target positions, the encoders provide feedback of the precise position of the glass substrate. Since the positioning system with the two cross stages X1 and X2 has the unique virtual rotary bearing configuration of the present invention, virtual rotation can be accomplished and precise placement of the glass substrate in an absolute X,Y coordinate system can be achieved. In addition, there can be laser interferometers, cameras and other sensing devices of relative or absolute position of the slide with respect to other machine members. The servo system can then be used to correct the errors with the three linear positioning stages Y and two cross stages X1, X2, mounted in the unique configuration of this invention using revolute joints for connecting the multiple X and Y stages, slides or pucks depending on the specific configuration. Servo corrections can be made by playing back the mapped coordinates of each degree of freedom including X, Y and rotary θ, or it could be calculate in real time using, as shown in the Appendix, the forward and reverse inverse kinematic relationship between absolute X, Y, θ coordinate system of the machine, where process work is done on the substrate, and the integrated coordinate system of the X', Y axes where positioning of X1, X2 and Y are being controlled.

In addition to the above configuration, an additional motorized rail or stage can be added to the Y stage (Y1,Y2) and have the Y also operate in a traditional Gantry mode, similarly to the two cross X stages X1, X2 which can be operated in Gantry mode also. This unique large travel, Double Gantry configuration is also possible through the unique invention of a revolute joint mechanism between X and Y stages. Although only three degrees of freedom are needed to position the Substrate slide in XY ⊖ direction, the Double Gantry configuration may have intentionally one redundant Yaw correction capabilities and one redundant degree of freedom. This unique configuration, which is a by product of this invention can be used in certain applications to make X straightness corrections when the Substrate slide moves in the Y direction, and make Y straightness corrections when the Substrate slide moves in the X direction. It can also use the Y1 Y2 gantry to correct for the slide Yaw in slow motion when the X stage is moving fast and similarly to use the X1, X2 gantry to correct for the slide Yaw in slow motion when the Y is moving fast. Thus, the novel integrated double X,Y gantry configuration including two cross X1, X2 stages and two Y1, Y2 stages can be used to achieve a higher degree of dynamic precision positioning. The redundant motorized stage which will be used as an idler while not needed for the positioning task can be any one of the X1, X2, Y1, Y2 and change during the process in real time. The need for this unique configuration will depend on the required positioning performance of the desired manufacturing process application.

BRIEF DESCRIPTION OF THE DRAWINGS

FIG. 1b is a side view of the positioning system of the configuration of the embodiment of the invention shown in 1a.

FIG. 9 is a side view of the positioning system of the present invention, shown in FIG. 8, showing an example of the large X Y rotary stage with virtual center of rotation used in production machine.

FIG. 10a is a top view of the positioning system of the present invention, similar to the one shown in FIG. 1 but with air bearing guide for the Y stage instead of recirculating rail as shown in FIG. 1.

FIG. 10b is a side view of the positioning system of the present invention shown in FIG. 10a.

FIG. 12b is a top view of another embodiment of the positioning system of the present invention as shown in FIG. 12a.

DETAILED DESCRIPTION OF THE INVENTION

As required, detailed embodiments of the present invention are disclosed herein; however, it is to be understood that the disclosed embodiments are merely exemplary of the invention, which may be embodied in various forms Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1A:
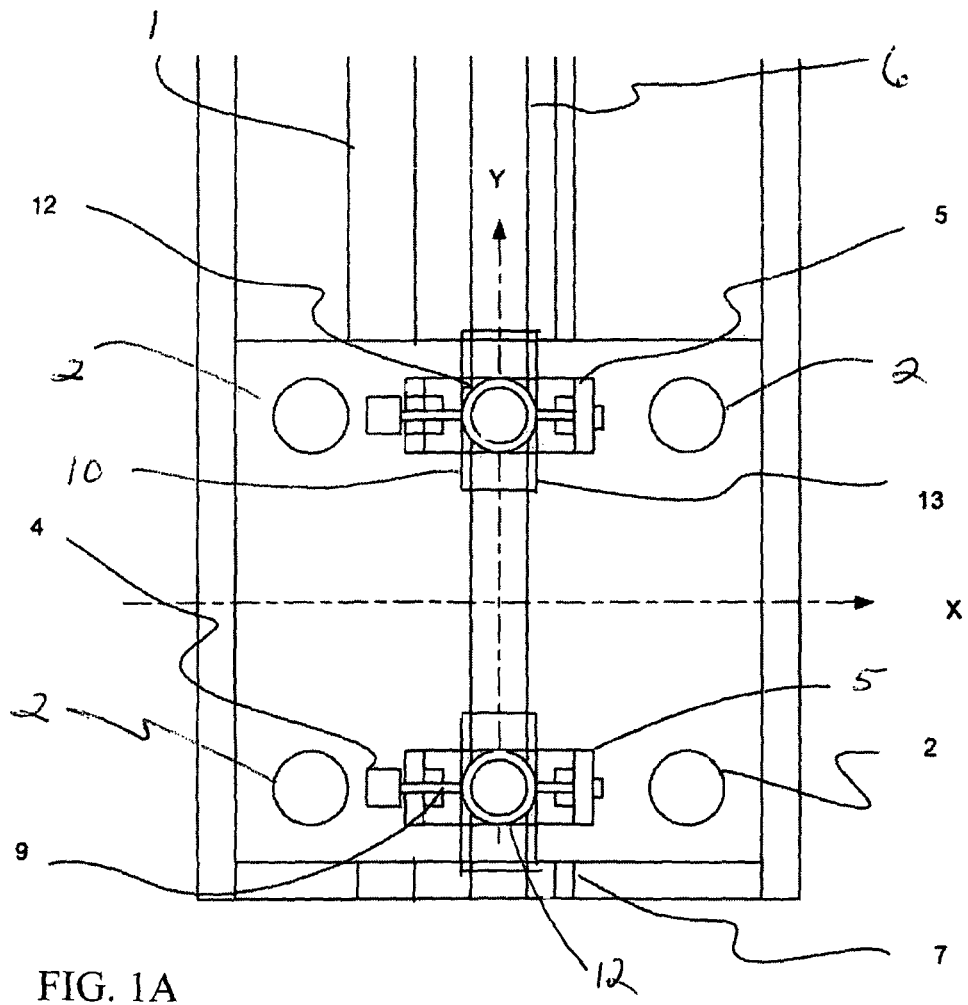
FIG. 1a is a top view of a positioning system configuration of the present invention where the main slide is floating on a plurality of air bearing pucks and guided by a recirculating bearing along a recirculating rail in the Y direction. The slides of the two cross X1, X2 stages are connected respectively by revolute joints to the two slides of the Linear Y guide bearing, where one of the Y slide is motorized and the other non motorized is free to move along the Y rail. The bases of the two cross X1, X2 stages are rigidly connected to the main machine slide.
Figure 1B:
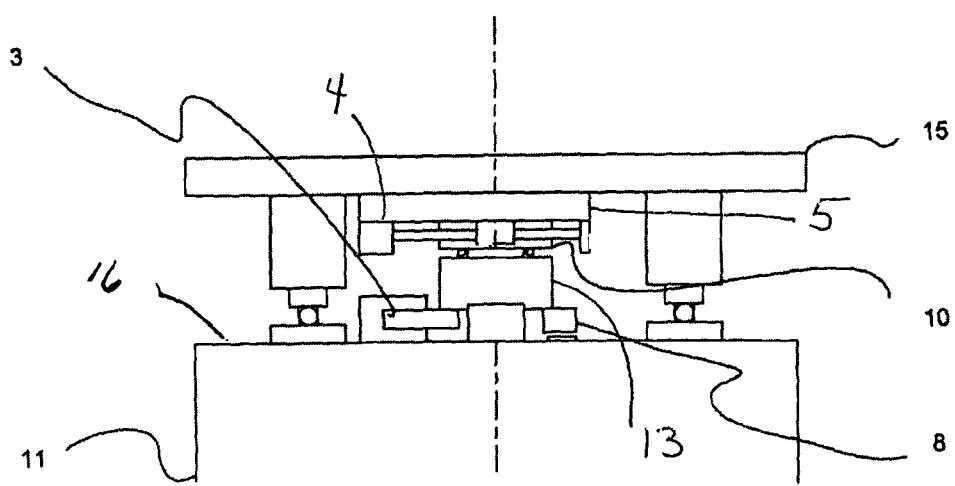

Drawing one's attention to FIGS. 1a and 1b one embodiment of the positioning system of the present invention is shown. The system of this embodiment may include a generally flat surface 16 on a base 11 on which the machine substrate slides. Plate 15, is free to move in a X axis and a Y axis and rotate in the ⊖ direction while being supported by at least one air bearing puck 2. Base 11 may be constructed of any suitable material known in the art including, but not limited to steel, aluminum, granite and the like. In a preferred embodiment a precision granite base assembly can be used for flat base 11. Granite, in some cases, is the preferred material, because of its extreme thermal stability and flatness. In addition, because the vertical bearing surface is the granite surface itself, excellent flatness, pitch and roll performance is achieved. Furthermore, granite can be lapped to incredible flatness tolerances and is dimensionally stable over time. It provides an excellent reference surface for the precision X-Y motion. Plate 15 may be constructed of any suitable material known in the art including, but not limited to metal, metal alloys, and the like. In one embodiment aluminum can be used for plate 15. In addition to plate 15 and base 11 there may also be bearing pucks 2. In a preferred embodiment four air bearing pucks can be used as shown in FIG. 1. Air bearing pucks may be preferred because of their stiffness and smooth motion. In general, it is the high stiffness of the bearings that support the stage and is critical to achieve the high dynamic performance required in this manufacturing process. Transitional vibrations that may occur immediately after acceleration and deceleration of the stage must be small in magnitude and dampen out quickly. Stiffness also has a direct influence on the servo performance of the stage, due to the resultant natural frequencies of the system and the drive-to-feedback coupling. The air gap between the bearing parts may be adjusted for the desired amount of stiffness. Other types of bearings may also be used in the present invention, for example one may use recirculating bearings as an alternative bearing, as also seen in FIGS. 4 through 9.

Moving substrate plate 15 is supported by at least one motorized linear rail 5. Motorized linear rail 5 may drive the X cross axes for most applications. Ball screw 9 and rotary motors 4 may be a preferred motor of choice because these motors are ideally suited for this type of positioning system, due to their high force and compact size. Stepper motors or linear motors can also be used to drive the X cross axes. Generally high force output motors of this type are preferably used in applications with large accelerations or abnormally large moving masses, as is the case with large glass format substrates that require fast movement and settle to their desired position within submicron precision.

In the preferred embodiment of the present invention, linear rail 5 is rigidly attached to top plate 15 and also has motorized linear slides 10 driving plate 15 in the X' direction which is rotated an angle $\ominus$ with respect to the direction of linear motion Y The slide 10 of rail is pivoted by a rotary bearing (revolute joint) 12 to a puck 13 which has a degree of freedom moving in the Y direction of linear motion of plate 15 along linear rail 6 which in turn is fixed to base 11. As seen in FIGS. 1a, 1b linear motion to plate 15 in the Y direction may be provided through at least one linear motor coil 3, which is attached to one of the Y pucks 13 and move along a magnet track 1, which is in turn attached to base 11 also seen in FIGS. 1a, 1b.

Figure 8:
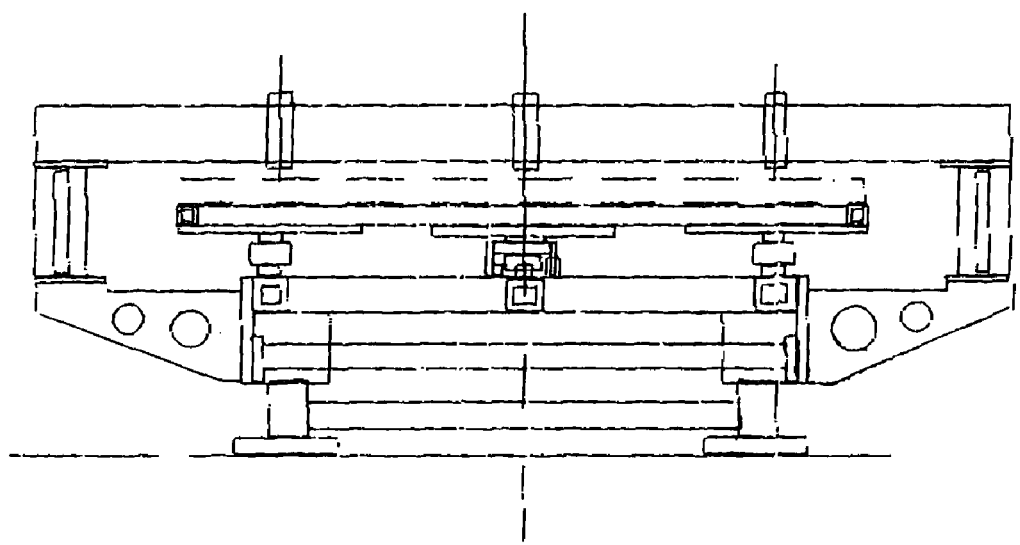
FIG. 8 is a front view of the positioning system of the present invention, showing an example of the beam, risers and additional stages which make up for a complete positioning system for production machines when used with the present invention, including an example of the large integrated X Y rotary ⊖ stage with virtual center of rotation.

Feedback to the motion controller of top plate 15 in the Y direction may typically, be provided by at least one linear encoder 8, which may also travel on puck 13 along linear encoder scale 7 which is fixed to the base 11. Feedback to the motion controller of top plate 15 in X' which is rotated an angle θ with respect to axis X, where axis X is perpendicular to axis Y, may be provided by rotary encoders attached to rotary motors 4 of X1, and X2 stages. Feedback in Linear X' translation is determined by the average of X1, X2 and feedback in θ rotation is determined by the difference in X1, X2 as commonly done in Gantry configurations. In one embodiment, one may use a high resolution optical linear encoders to provide positioning feedback on all axes. Generally the encoder scales on most large glass format substrates positioning systems are glass, so that thermal expansion of the large glass substrate is automatically matched by thermal expansion of the encoder scales. Alternatively, thermal monitoring and real time accuracy correction can be applied using an automation controller. With this type of system the stage temperature is independently measured and put into the controller, which then calculates a corrected stage position in real-time based on the materials CTE (Coefficient of Thermal Expansion). Another feature of the present invention is that the encoder heads may be placed by brackets at an elevation as close as possible to the glass level to reduce Abbe Offset. Abbe Offset is present when the axis of measurement is not coincident with the plane of the work piece. In normal operation when Y motor coil 3 stops and X1, X2 motorized linear rails 5 move in opposite directions, top substrate plate 15 will rotate about a virtual center which is determined by the amount of travel of each stage. Exact opposite travel will result in a rotation about a virtual center of rotation at the mid center. If X' travel is only with one X1 or X2 stage then the result will be a virtual rotation about the revolute joint of the other stage. If motorized linear slides 10 travel in the same direction then top substrate plate 15 will move only in the X' direction. It should be noted that X' direction is fixed to the top plate 15. If plate 15 rotates by a certain amount θ then the body fixed X' axis is rotated the same amount θ with respect to the Machine X axis which is fixed to base plate 11 and perpendicular to Y. In a general case a motion in the body fixed X' direction when the substrate plate is rotated an angle θ, will result in a slight residual displacement in the absolute Y and X directions. This residual Y displacement can be corrected easily by the X1, X2 and Y motors and encoders busing Forward and Inverse trigonometric calculation in the motion controller. These transformations are provided in the Appendix and serve as an integral part of the invention. Similarly the corrected Substrate motion in X, Y, θ directions using position targets as provided by Maps stored in the motion controller, can be precisely reached by commanding X1, X2, Y machine axes, using the kinematic transformation rules as shown in the Appendix, As mentioned previously, the positioning system of the present invention may include a machine base portion 11. Base 11 may include different sub assemblies, as shown in FIG. 8, the types of sub assemblies used will depend on the desired application. For example, one may implement, as mentioned previously, a precision cross granite or steel beam mounted to the base 11 on risers and, depending on the type of process application that is being implemented, one may incorporate additional slides in absolute X and Z directions mounted to the fixed cross beam to position tools, testing and inspection equipment with respect to the glass substrate. These are just but a few different features that machine base 11 may include.

As noted above, FIG. 2 is a kinematic diagram showing the two cross stages X1 (21) and X2 (22) moving large displacements in opposite directions exactly the same amount and generating large rotation about a virtual center of rotation at exactly half the distance between them. There is the moving plate 23 which has a virtual pivot point 20 in this particular example exactly between X1 and X2. There is a cross slide 21 of the cross stage X1 that pivots about the Y slide 25. Either slide may be for example, a recirculating bearing puck, a positioning stage slide or an air bearing slide. There is also a similar cross slide 22 of cross stage X2 on the other side of the moving plate 23. The pivoting point of each X slide is obtained by a revolute joint which connects the slides of the X stages 21 to their respective slides on the Y stages 25. These two revolute joints allow for relative rotation between the cross stages X1 X2, which are mounted to the moving machine substrate plate 23, and fixed base of the Y stage, which is mounted to the base plate 11.

Figure 2:
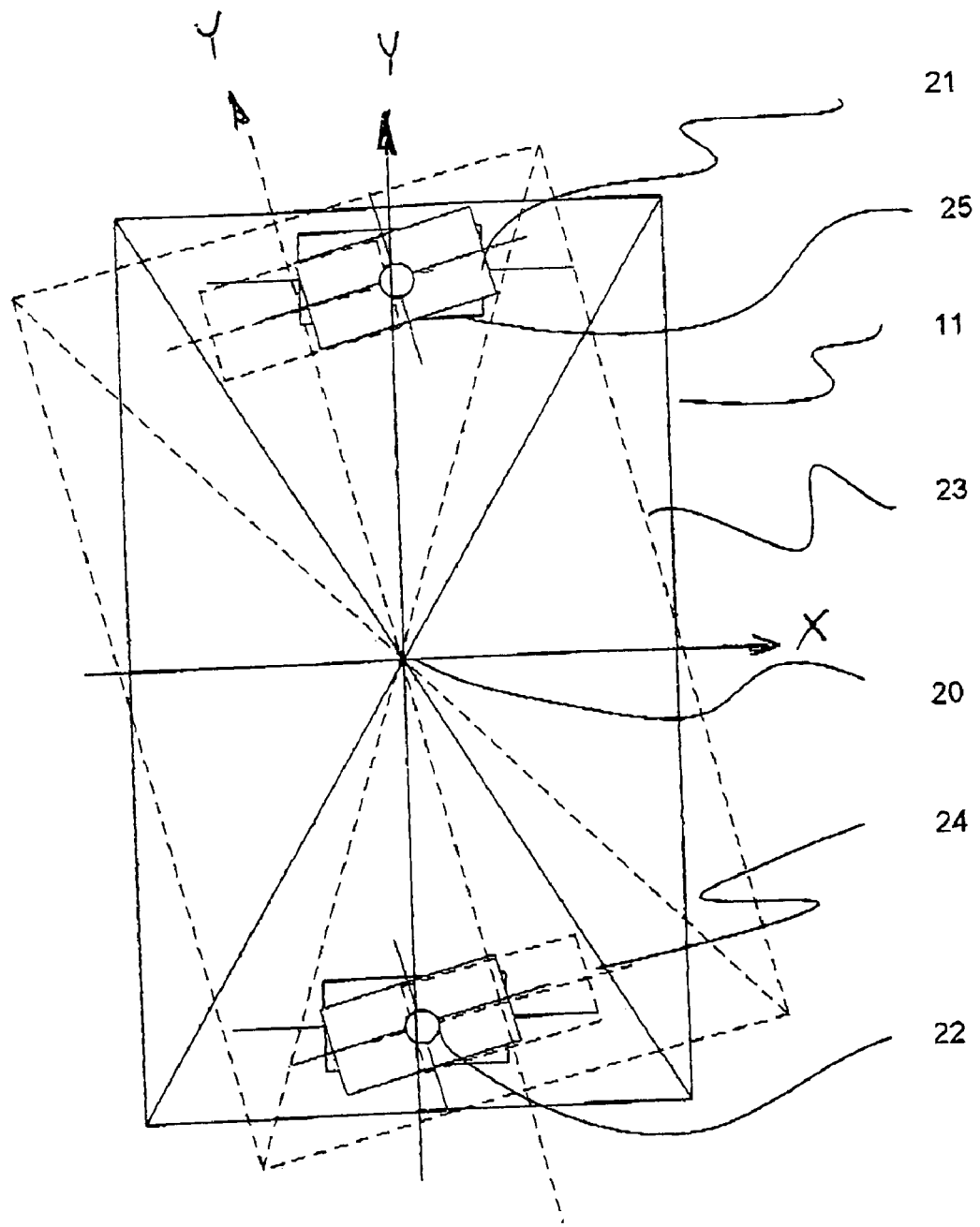
FIG. 2 is a kinematic diagram showing the two cross stages X1, X2 moving large displacements in opposite directions exactly the same amount and generating large rotation about a virtual center of rotation at exactly half the distance between them. For clarity the Y rail along Y axis is not shown.
Figure 3:
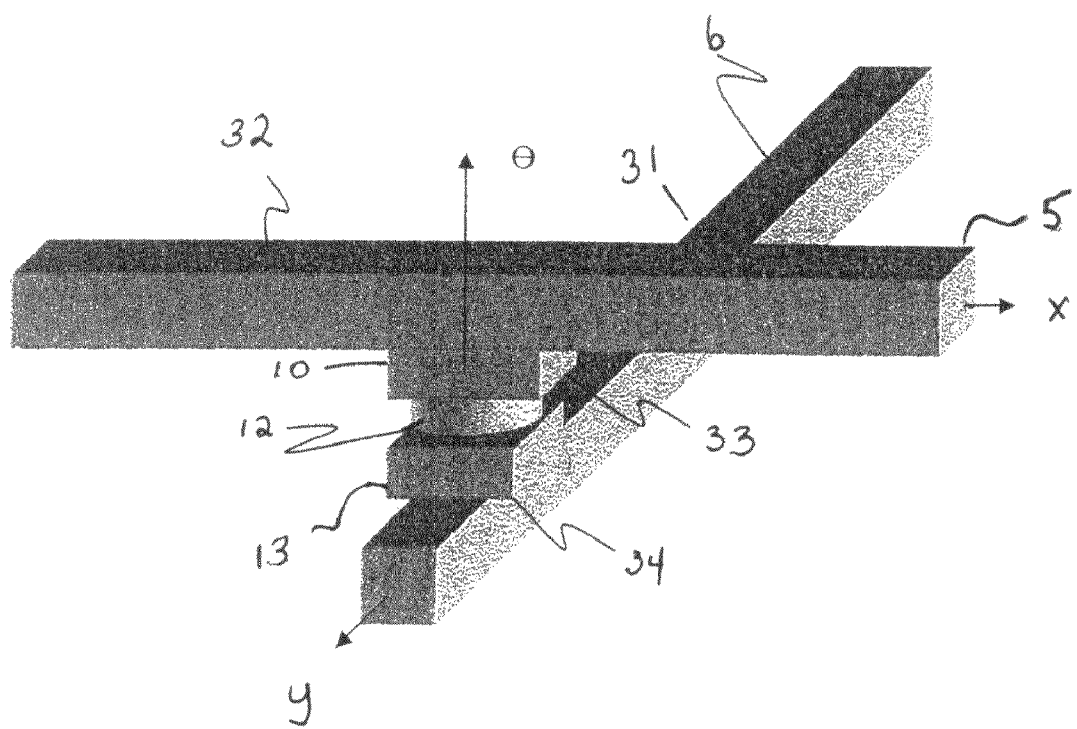
FIG. 3 is an orthogonal perspective view of the basic revolute joint mechanism of the positioning system of the present invention where the revolute joint is connecting two puck slides of X and Y rails which provides the ability for the top X rail member to move in X, Y and Rotational ⊖ directions. This unique joint is a basic element of the invention and can be configured in many combinations to provide integrated X, Y, Rotary ⊖ motion with virtual center of rotation for precision positioning systems of a large format.

It must be pointed out that one important feature of the invention as described in FIGS. 1 and 2 is in the manner that the X, Y slides of the present invention are preferably connected. As seen in FIG. 3 the provision of virtual rotation of large displacement is done using revolute joints between the slide of the X stage and the slide of the Y stage. FIG. 3 is an orthogonal perspective view of the basic revolute joint mechanism of the positioning system of the present invention where a revolute joint connecting two slides or rail pucks provides the ability for the top member to move in X, Y and Rotational $\ominus$ direction. This joint can be configured in many combination, described in following paragraphs, to provide integrated X, Y, and Rotary $\ominus$ motion for positioning systems of a large format. There is a Y linear rail 31 fixed in X, Y base plane, as well as a X linear rail 32 fixed in X'Y' moving plane. There is a linear X slide (puck) 33 moving with respect to rail X and a linear Y slide (puck) 34 moving with respect to rail Y. Rotary Bearing (referred to as a Revolute Joint) 35 which connects the slide 34 to 33 allows relative rotation of rail 31 and 32. It should be noted that in the foregoing description of the present invention some of the X Y rails and pucks can be passive and some are motorized. In cases where X and/or Y are motorized then the respective rail becomes a positioning stage base and the respective puck becomes a positioning stage slide.

FIG. 4 and FIGS. 5 through 7 that show another configuration of the present invention, with recirculating bearing that support of the substrate plate. The two slides in the X direction X1, X2 are motorized and one slide in the Y direction is motorized and all other X' and Y pucks are free to move along their respective X' and Y rails. In another configuration, as shown in FIGS. 11 and 12, two slides in the Y direction, Y1 and Y2, and one slide in the X' direction are motorized, while all other X' and Y pucks are free to move on their respective X',Y rails. In the most general case, as described earlier, and shown in FIGS. 4b and 4c, two slides X1, X2 in the X' direction as well as the two slides Y1, Y2 in the Y direction can be motorized in a double Gantry configuration which is unique to this invention. This last configuration which results in a double Gantry as discussed previously, can use any three motorized stages out of X1, X2, Y1, Y2 as independent stages to position the substrate, where the fourth motorized stage will either be idler or be commanded by the positioning system controller to move in a precise coordinated way to be synchronized with the three independent axes without over constraining the motion. This unique feature can be used to preload the ball screws, remove backlash and increase the stiffness despite possible wear and tear in certain application. All of these configurations are possible using the revolute joint invention and one can select the best configuration for the required specific positioning application.

Figure 4A:
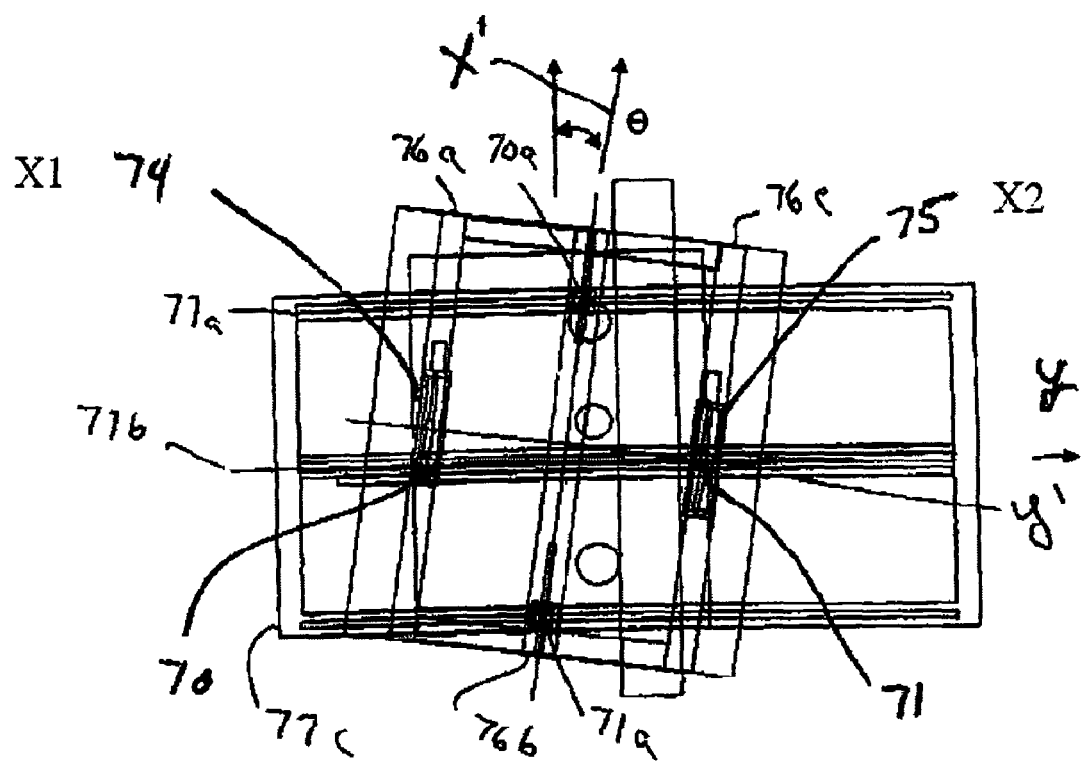
FIG. 4a is a top view of the positioning system of the present invention, using four of the basic joint elements of this invention, as shown in FIG. 3. The example is showing large ⊖ rotation alignment of substrate for subsequent X, Y motion using recirculating bearings.

FIG. 4a is a top view of the positioning system of the present invention, using four of the basic joint elements of this invention, as shown in FIG. 3 using three parallel rails 76a, 76b, 76c in the Y direction fixed to the machine base and three parallel rails 77a, 77b, 77c in the X' direction fixed to the substrate slide. Note that all four recirculating pucks 70, 70a, 71 and 71a are carrying the moving substrate plate, much in the same way as the air bearing pucks were carrying the load in FIG. 1. The example is showing large rotation alignment of substrate for subsequent X, Y, θ motion using recirculating bearings. For XY positioning and rotational motion of the substrate, linear motors and encoders not shown) may be added to X pucks 70 and 71, and linear motor and encoder are added to one of the Y pucks below X pucks 70a or 71a. In addition, through trigonometric transformation formulations, as shown in the Appendix, one can control and monitor the positioning system from body fixed coordinate system X'Y' to base fixed coordinate system XY and vice versa using forward or inverse transformations respectively. With this type of configuration, rotation θ of the substrate plate in the XY coordinate system is made about the revolute joint of the motorized Y puck 70a or 71a. This can be achieved by controlling the travel in X actuators 74 X1 and 75 X2 of pucks 70 and 71 respectively. After rotation θ linear actuators bases 74 and 75 remain parallel in the body fixed X' direction, as seen in FIG. 4 but the idler Y puck changes its distance from the motorized Y puck along the Y rail. With the above configuration, at any position θ, travel of the two linear actuators 74 and 75 in the same direction and equal distance will result in pure translation in body fixed X' direction, as may be seen in FIGS. 7a and 7c. In addition, at any X, Y, θ position, travel of the two linear actuators 74 and 75 in opposite directions, but equal distance will result in a θ rotation in XY plane. The analytical relationship between translation and rotation in XY and X'Y' coordinates is given in the Appendix. In general, if for example there is any combination of general travel of linear actuators 74 and 75 the result will be a combined rotation θ and translations in directions Y and X'. In a most general X, Y, θ position of the main substrate slide there also may be a small residual movement in the X'Y directions due to the virtual rotation θ, this movement may be calculated by the trigonometric formulation given in the Appendix and corrected by the controller as may be needed. Furthermore, if for example there is any motion of actuators 74 and/or 75 that result in rotation θ, although the relative distance between pucks Y1 70a, and Y2 71a, along the Y rail will change, the position of one Y puck will be controlled and the other will be free to move and assume an explicit position depending on the position of X1, X2 and Y and other geometrical parameters as shown in the Appendix. It should be noted that puck X1 70 is connected to puck Y1 70a through a revolute joint, and similarly puck X2 71 is connected to puck Y2 71a through a revolute joint. Finally, as mentioned earlier, if there is any general motion generated by the controller in the fixed Y direction and the two X actuators X1 74 and X2 75, there will also be motion components in the machine fixed X direction, which can also be calculated and corrected as needed via the trigonometric coordinate transformation equations as shown in the Appendix.

Figure 4B:
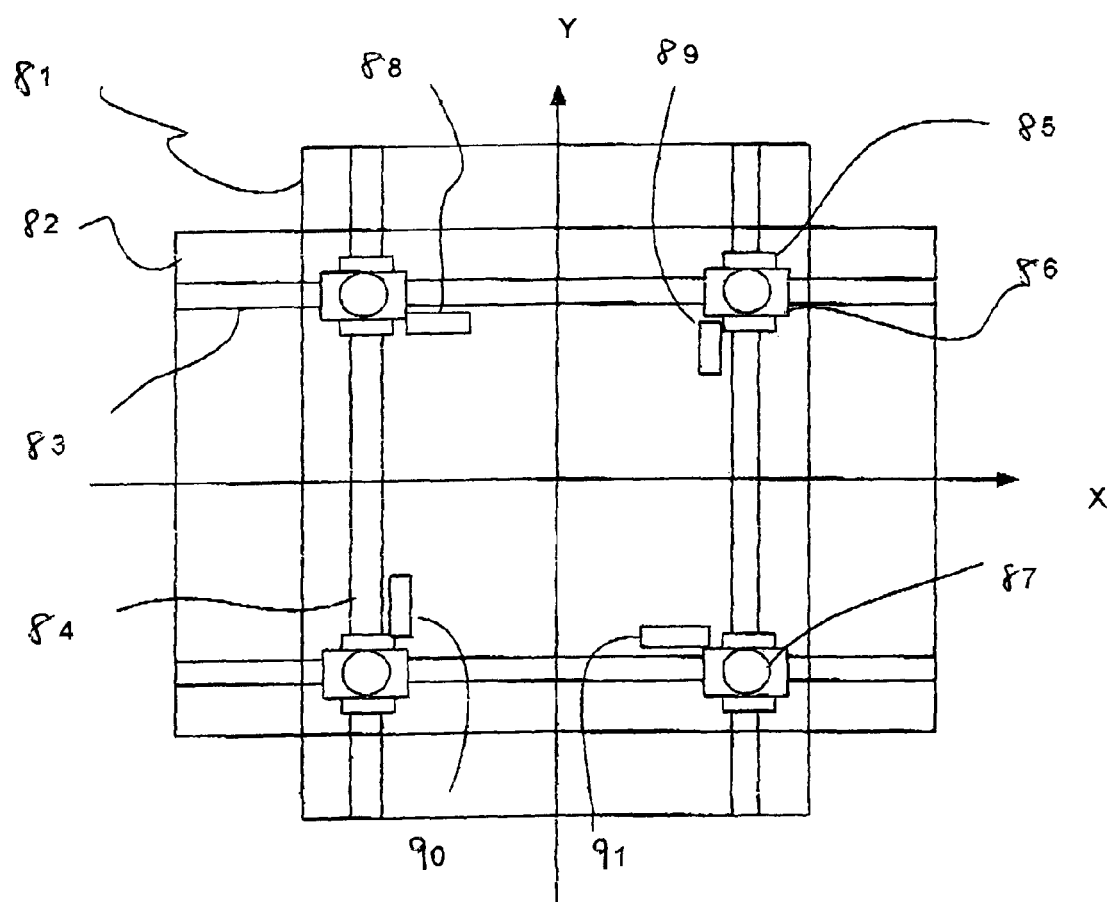
FIG. 4b and FIG. 4c show two slides X1, X2 in the X' direction as well as the two slides Y1, Y2 in the Y direction can be motorized in a double Gantry configuration

FIG. 4b shows a double gantry configuration using the revolute joints of the invention. A bottom plate 81, fixed to the machine base has two parallel linear Y rails 84 and four slides (pucks) 85. A top substrate plate 82, which supports the substrate, with two parallel X rails 83 has four slides (pucks) 86. The four X Slides 86 are connected to their respective four Y slides 85 through four revolute joints 87. Any two of the X pucks and any two of the Y pucks can be motorized, but only three can move independently while the fourth can serve as a temporary idler and commanded to move along the constraints determined by the motion of the three motorized axes and kinematic equations for the idler similar to those shown in the Appendix. Two of the Y slides, for example Y1 90, and Y2 89 and two of the X slides for example X1 88, and X2 91 are motorized. In this configuration when Y1 and Y2 are moving the same distance the Top plate 82 is translating in the Y direction. When X1 and X2 are moving the same distance the Top plate is moving in X' direction which is rotated an angle ⊖ with respect to the X direction. When X1 and X2 are traveling in opposite directions only one of the Y motorized rails Y1, or Y2 can be free to move independently along its rail while the other Y puck must be either free to slide along its rail or move according to a constraint relationship with motorized X1, X2 and the motorized Y. Similarly when Y1 and Y2 are traveling in opposite directions only one of the X motorized rails X1 or X2 can move independently with the other free to move to allow for top plate rotation. Using computerized controller this unique double gantry mechanism can be used with very low cost motorized rails, with ball screw or linear motors where the fourth dependent motor can increase stiffness remove backlash or simply run idle. In an interesting application the selection of the idler motor can be determined in real time for maximal precision.

Figure 4C:
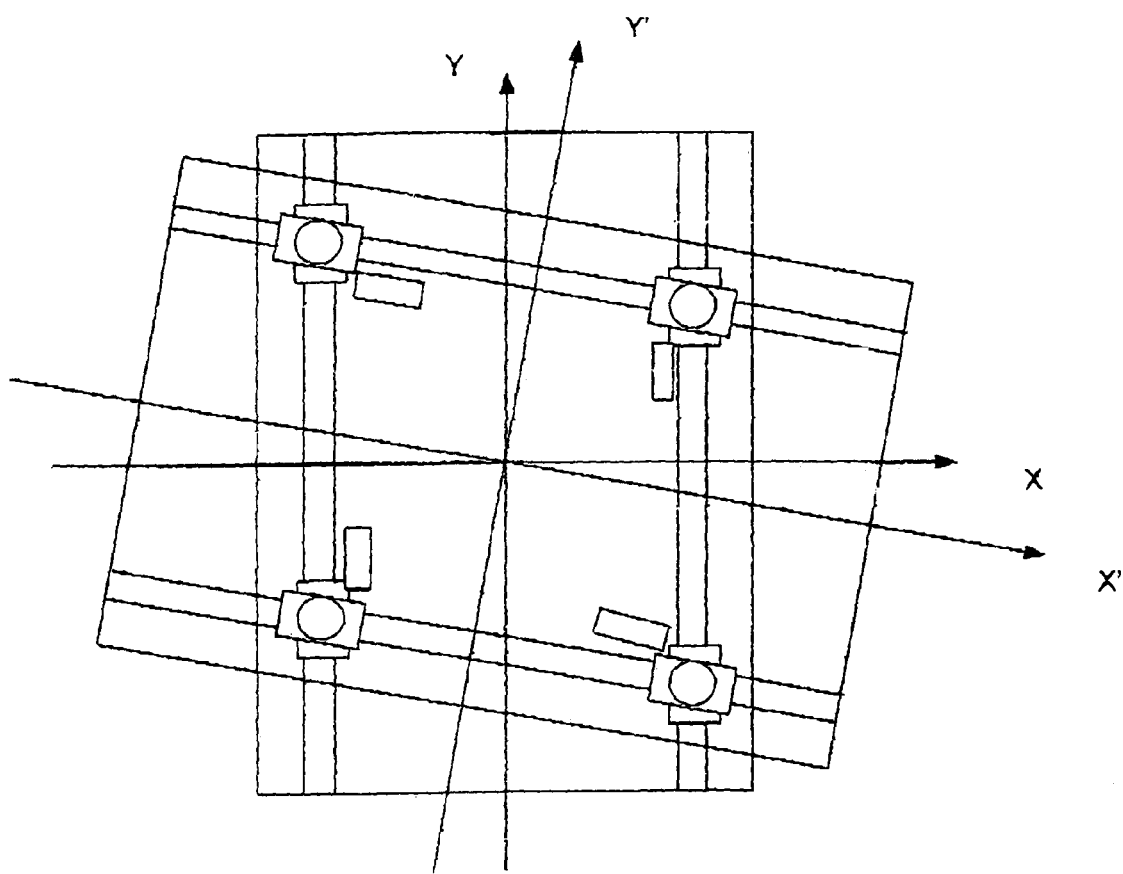

FIG. 4c shows the double gantry configuration in 4b with the top plate 82 rotated about the bottom plate 81.

Figure 5A:
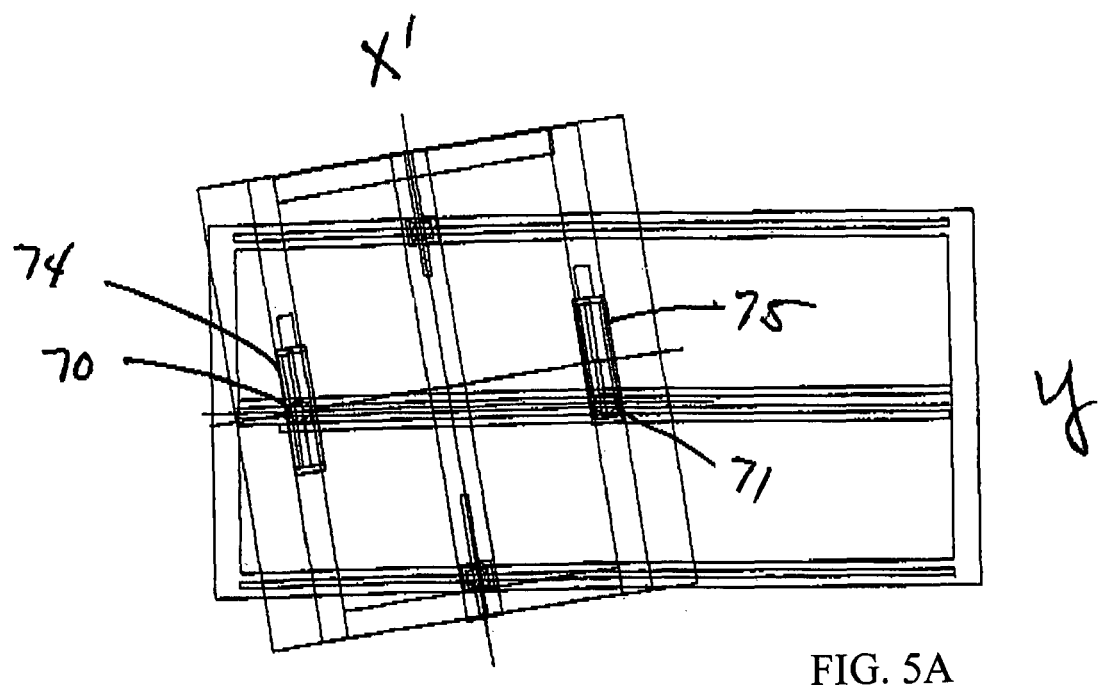
FIG. 5a is a top view of the positioning system of the present invention, with a recirculating bearing configuration showing the virtual center of rotation at the center of the left puck revolute joint.
Figure 5B:
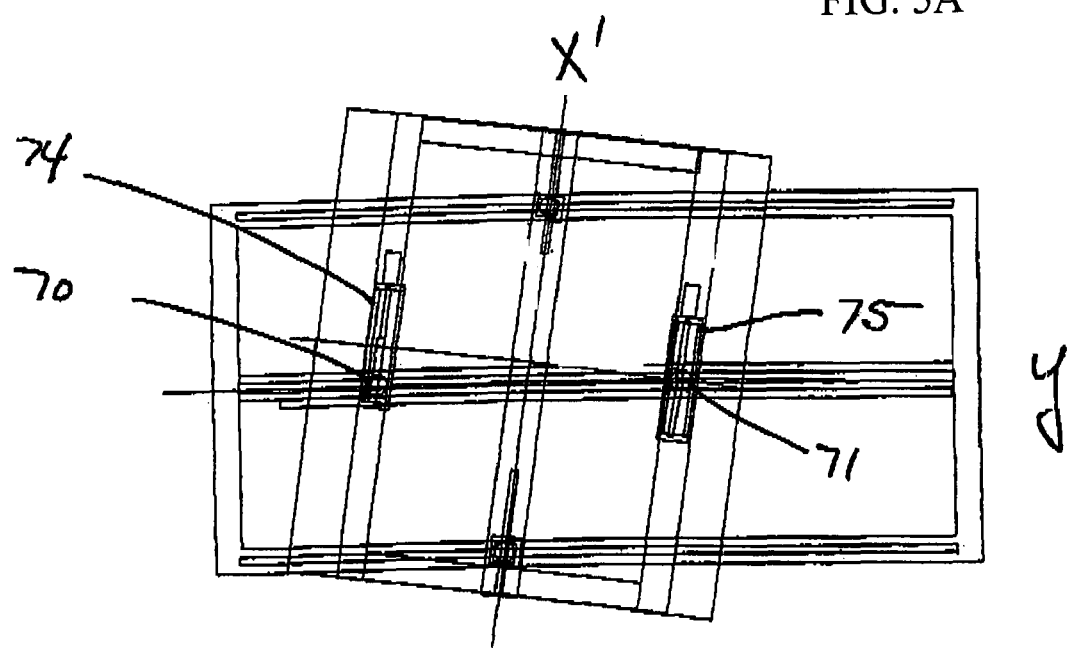
FIG. 5b is another top view of the positioning system of the present invention, with the virtual center of rotation at the center of the right puck revolute joint.

FIG. 5a is a top view of the positioning system of the present invention, with a recirculating bearing configuration showing the virtual center of rotation at the center of the left X puck revolute joint 70. FIG. 5b is another top view of the positioning system of the present invention, with the virtual center of ⊖ rotation at the revolute joint center of the right X puck 71.

Figure 6A:
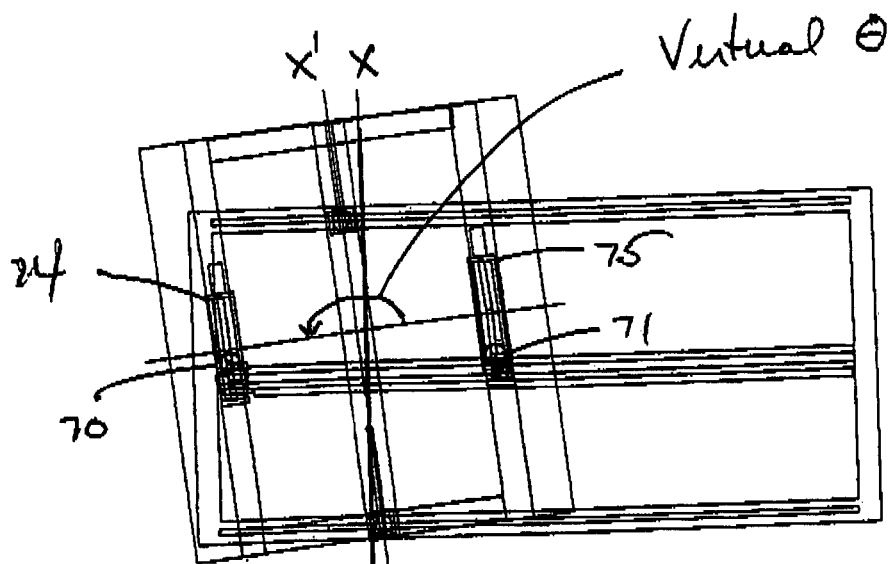
FIG. 6a is a top view of the positioning system of the present invention, with combined X' full travel, with the virtual rotation about the center between the two X pucks revolute joints.
Figure 6B:
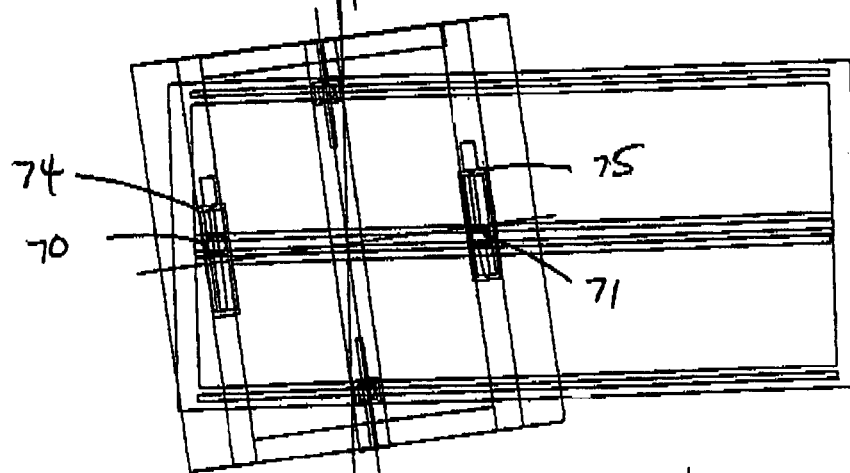
FIG. 6b is another top view of the positioning system of the present invention, with pure rotation, with no X' travel.
Figure 6C:
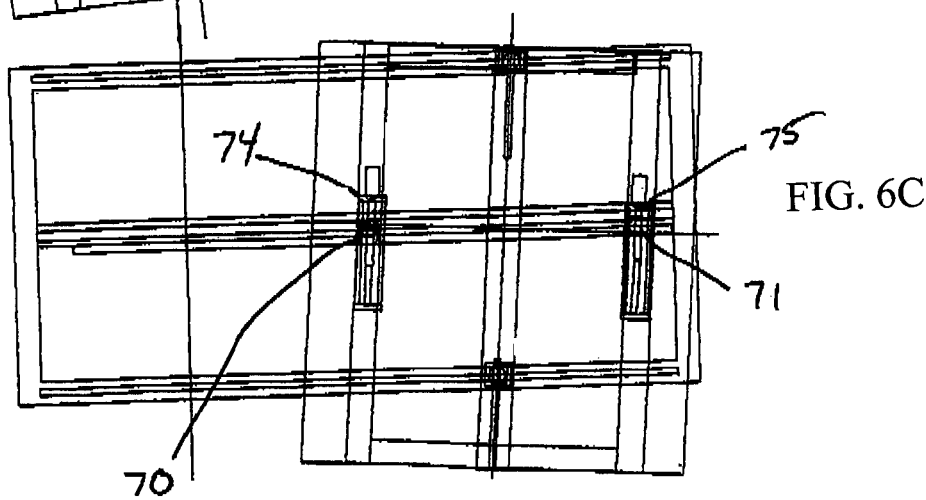
FIG. 6c is yet another top view of the positioning system of the present invention, with X' in negative full travel and Y in full travel, with the center of rotation between the two centers of the two revolute joints of pucks X1 and X2.

FIG. 6a is a top view of the positioning system of the present invention, with combined X' full travel in the positive direction, with the ⊖ rotation about a virtual point between Pucks 70 and 71. FIG. 6b is another top view of the positioning system of the present invention, with pure rotation about the virtual point at the center between Pucks 70 and 71, with no X' travel. FIG. 6c is a top view of the positioning system of the present invention, with combined X' full travel in the negative direction, with the ⊖ rotation about a virtual point between Pucks 70 and 71.

Figure 7A:
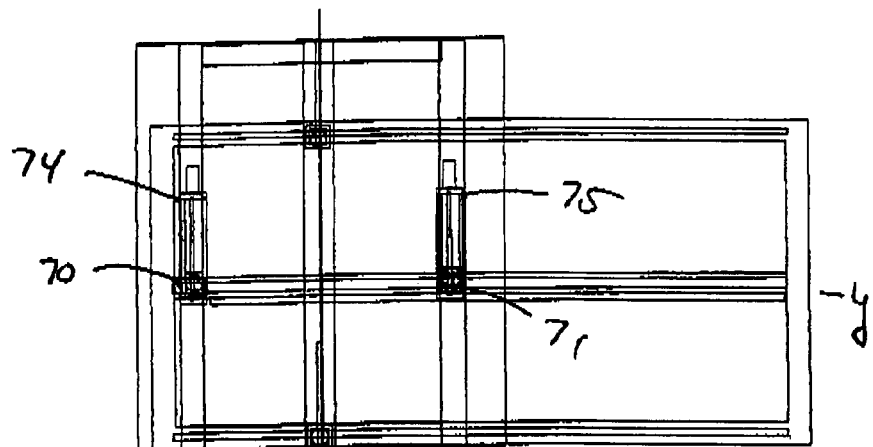
FIG. 7a is a top view of the positioning system of the present invention, with pure translation in the positive X' direction, without virtual rotation.
Figure 7B:
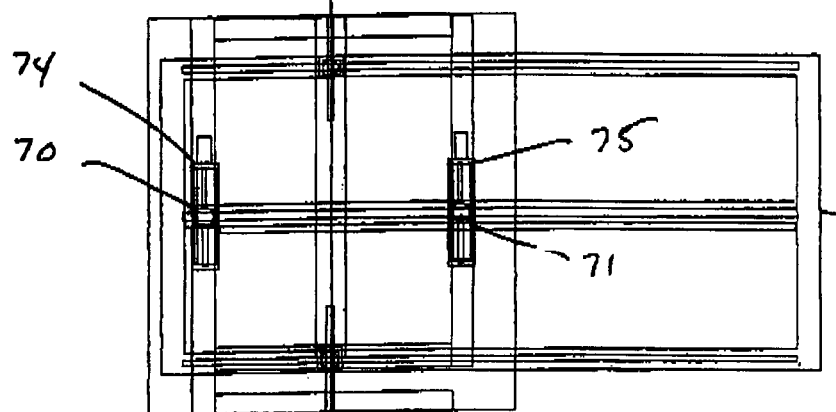
FIG. 7b is another top view of the positioning system of the present invention, without translation in the X', Y directions, and without virtual rotation.
Figure 7C:
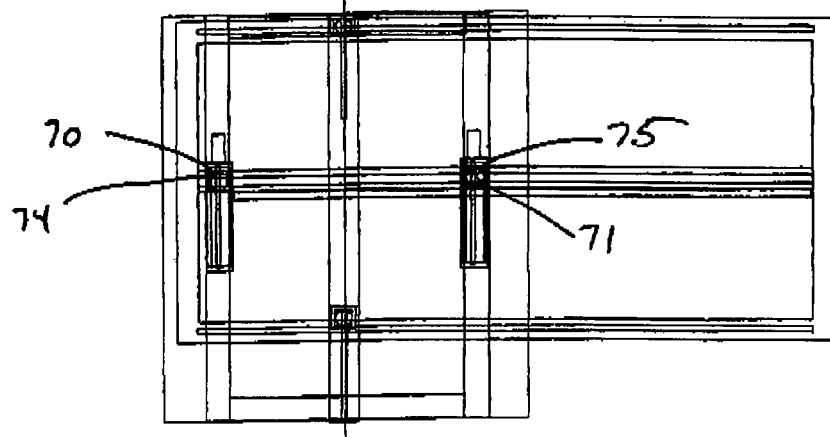
FIG. 7c is yet another top view of the positioning system of the present invention, with pure translation in the negative X' direction, without virtual rotation.

FIG. 7a-7c is a top view of the positioning system of the present invention, with pure translation in the X' direction, without Y translation or virtual ⊖ rotation.

The front view of a positioning system as applied, for example, to a flat solar panel or Flat Panel Display manufacturing application including the present XY ⊖ rotary positioning system as shown in FIG. 7 with additional risers, bridge and cross stages mounted on the bridge are shown in FIG. 8. The side view of the positioning system is shown FIG. 9a and the top view is shown in FIG. 9b. Additional configurations of the present invention will now be discussed.

Figures 10A, 10B:
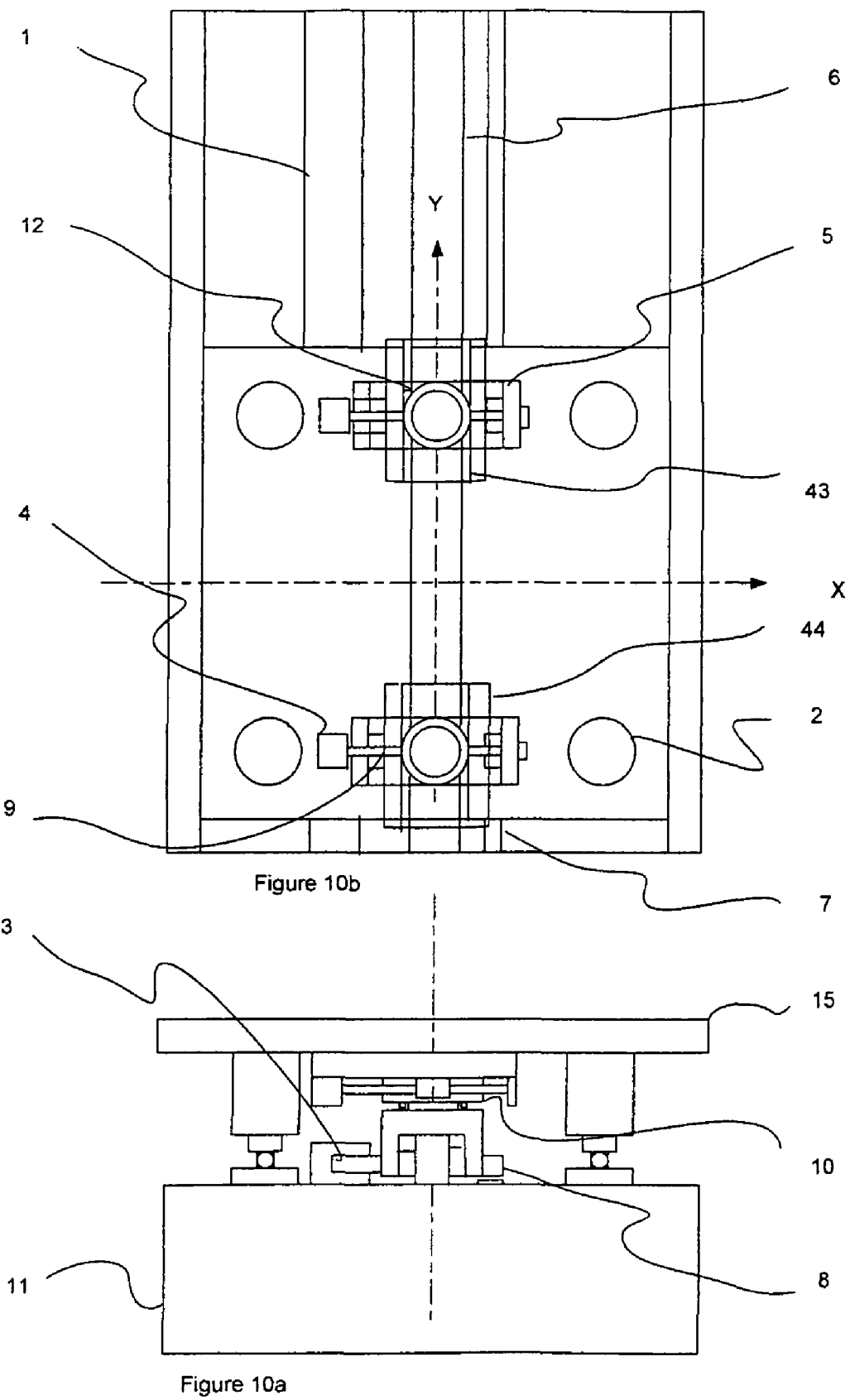

Drawing one's attention to FIGS. 10a and 10b, which is similar configuration to FIG. 1 with Y axis guided by an air bearing stage rather than by recirculating bearing as shown in FIG. 1. In normal operation the moving slide which supports the flat panel includes aluminum plate 115. Aluminum plate 115 serving as the substrate slide may be supported by 4 lift air bearing pucks 102. In addition, two Y guide air bearings slides Y1, Y2 143 and 144 riding on granite Y rail 106, may be used to provide linear guidance for aluminum plate 115 in Y direction. Aluminum plate 115 is driven by, for example, motors 103 mounted to one of the Y air bearing slides 143 or 144 with motor magnets 101 mounted to the base 111, and linear encoder 108 also mounted on air bearing slide 143 or 144 and encoder scale 107 mounted to the base 111. The two slides 110 of the traverse ball screw 109 actuators X1 105 and X2 driven by rotary motor 104, which rigidly attached to plate 115 are connected to the Y slides 143 and 144 through revolute joints 112 to provide the required virtual rotational motion of aluminum plate 115 with respect to granite base surface 111 which is one of the significant features of this invention as explained in FIGS. 1 to 8. The provision of large θ rotational and large displacement of XY stages may be required for initial glass alignment with respect to machine coordinate system XY on which the process tools are located. For this purpose the rotational θ motion will be done first with misalignment input from a camera fixed to the machine frame, not shown. The camera detects fiducial images on the glass substrate to provide the alignment XY θ errors which are required to be corrected with large XY and θ rotational displacement to achieve linear alignment of the glass substrate with respect to the machine base and the tools which are attached to it. This alignment can be done in the present invention by using the inverse kinematic equations shown in the Appendix where X1, X2 and Y are commanded to move a certain calculated distance to position a fiducial point Q on the substrate to coincide with a Camera focal point P on the machine base with a desired corrected Substrate angle θ. In addition, the straightness and yaw errors of the aluminum substrate plate 115 will be mapped throughout the required travel in their respective X and θ rotation and their errors can be corrected by the two cross X stage. The unique advantages associated with this embodiment are a combined large motion in Y, X, θ directions with correction of both large yaw rotation angle and large X position error for initial alignment of the substrate, as well as corrections of small yaw and straightness errors during process. This provision can be made possible by the inclusion of the unique two X stages, X1 and X2 with at least one Y motorizes slide and one Y idler slide connected by two or more resolute revolute joints. The invention provides a low cost solution using standard stages mapped to X, Y and θ precision.

The base of each ball screw stage 105 will be rigidly attached to the main slide 15. The main slide supports the substrate (the words Plate, Substrate Slide and Main Slide can be used interchangeably in the description). The slides of the X ball screw stages 105 will be mounted on a rotary bearing (revolute joint) to allow ⊖ rotational degree of freedom with respect to the slide 143 and 144 of the Y axis. The main substrate slide 15 may have a virtual center of rotation located at a point depending on the travel of each X stage. The relationship between X1, X2 travel and Rotational motion ⊖ will be explicitly shown in the Appendix.

Figure 11A:
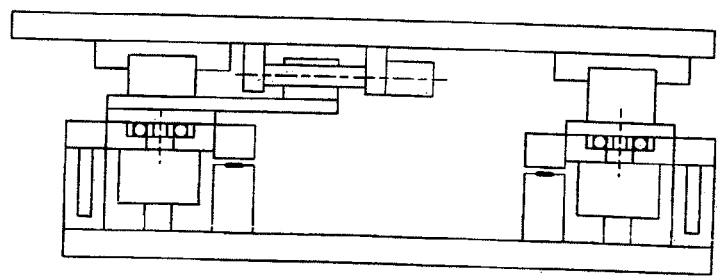
FIG. 11a is a side view of another embodiment of the positioning system of the present invention with the main machine substrate slide moving on four recirculating bearing in with the basic unique configuration of this invention as shown in 3 with two linear motors Y1 and Y2, one on each side in a Y gantry mode which can generate large ⊖ rotation to the machine substrate slide and with one motorized cross stage X which can generate the cross motion in the X' direction of the substrate slide.
Figure 11B:
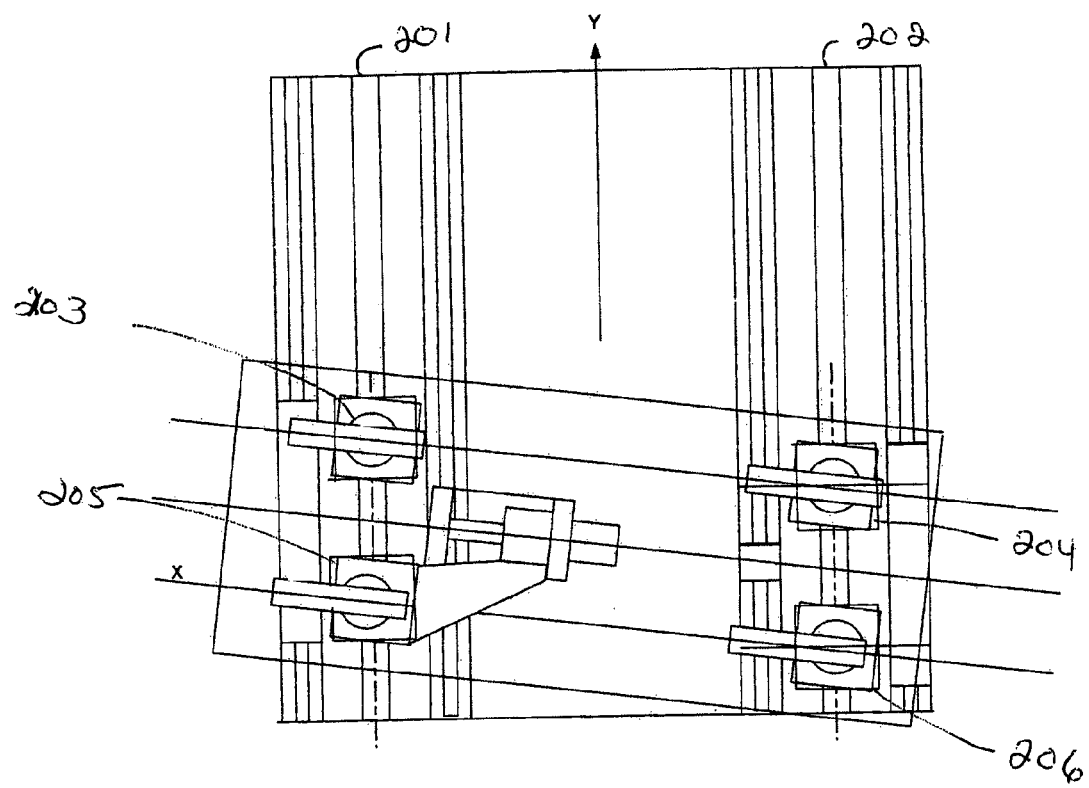
FIG. 11b is a top view of the positioning system of the present invention as shown in FIG. 11a with the main slide centered.
Figure 12A:
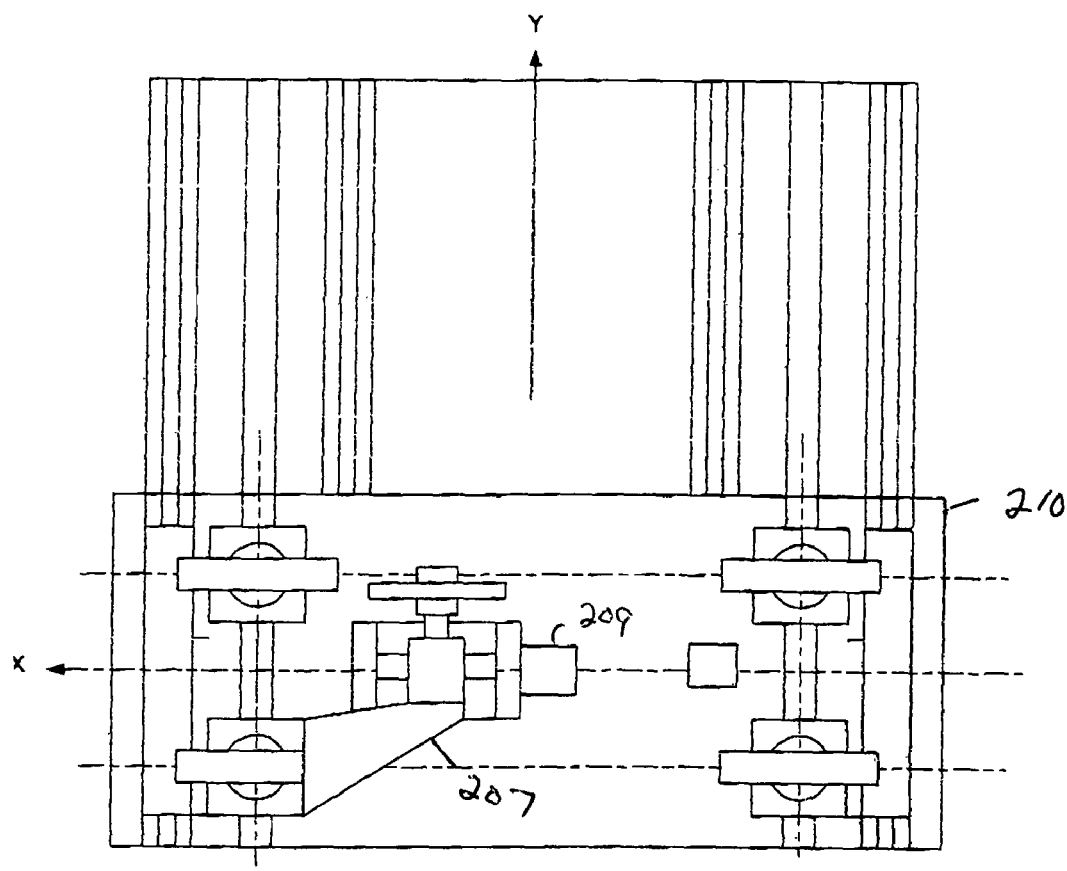
FIG. 12a is a side view of another embodiment of the positioning system of the present invention as shown in FIG. 11a with the main substrate slide rotated and displaced.
Figure 12B:
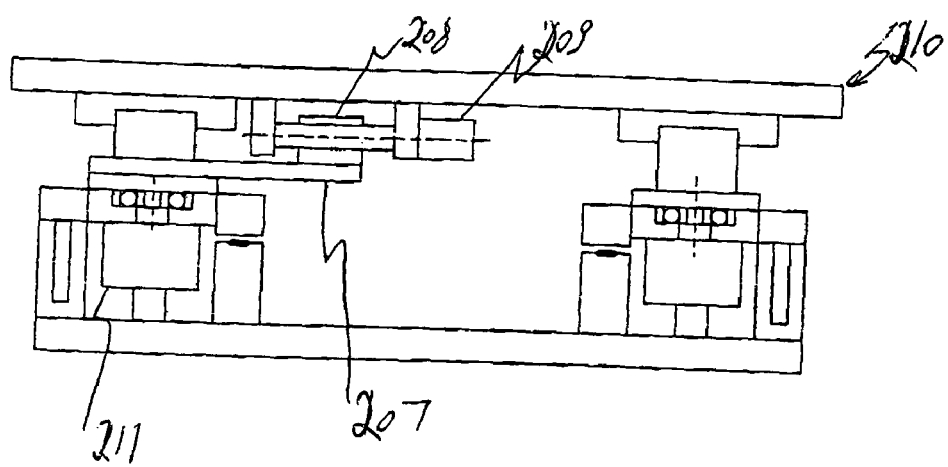

In another embodiment, as seen in FIGS. 11a-12b, by using the unique revolute joint invention, as shown in FIG. 3, there can be all four recirculating pucks carrying the moving load on the substrate plate, much in the same way air bearing pucks were carrying the load in FIG. 1 and FIG. 10, thus allowing for the rigid vertical support of the substrate plate. This is also a similar configuration to the one shown in FIGS. 4b and 4c, with substrate slide moving by two side Y stages in a double gantry configuration instead of a single Y stage in the center of the substrate slide as shown in FIG. 4a. As seen in FIGS. 11a and 11b the Y stage may have two parallel linear rails 201 and 202, along with four pucks, including 203, 205 which consist of stage Y1 and 204, and 206 which consist of stage Y2. In this configuration the distance between the four pucks in X' direction and in the Y direction may change throughout the Y1 and Y2 motion. This allows one to drive each side of the Y stage with one linear motor and one linear encoder connected to either one of the Y1 pucks 203 or 205 and one linear motor and one linear encoder connected to one of the Y2 pucks 204, 206 in a Gantry mode, which may allow for very large relative displacement between the independent Y1 and Y2 stage. When the Y1 motor is commanded to move relative to the Y2 motor, relative motion may be generated about a virtual center of rotation. The amount of rotation will depend on the amount of Y1 and Y2 displacement. If for example Y1 and Y2 move in exactly opposite directions from their 0,0 position at equal distances, the result will be rotation at the geometric center between them, similar to previously mentioned embodiments. If however both Y1 and Y2 move in the same direction at equal distances the result will be no rotation. Furthermore, at any rotation ⊖, as shown in FIG. 12b, the X motor, using a linear encoder, can be commanded to move the plate 210 in the X' direction. This is achieved because rotary motor 209 is attached to integrated Y/X slide 210 and the nut of X ball screw 208 is attached to one of X pucks 211 via X support bracket 207.

With all the aforementioned embodiments all relative motion of the pucks with respect to their slides and rotation with each other can be sensed with standard encoders commonly used in the industry. In addition, the encoders can be used for developing averaging and smoothing motion control algorithms. For more high precision applications motion can be calibrated in both X and Y directions using a laser interferometer, the calibrated motion can be saved within a motion controller and played back as corrected target positions for the substrate plate in X, Y and ⊖ directions using the reverse kinematic formulation in the Appendix to simultaneously drive X1, X2 and Y.

As various changes could be made in the above constructions without departing from the scope of the invention, it is intended that all matter contained in the above description shall be interpreted as illustrative and not in a limiting sense. In the view above it will be seen that several objects of the invention are achieved and other advantageous results attained, as defined by the scope of the following claims.

The invention claimed is:

1. A compound positioning system where a first positioning stage is rotatably mounted on top of a second positioning stage for use in providing submicron translation errors for large substrates, said compound positioning system comprising:
   a base having a generally flat top surface extending in an X direction and a Y direction;
   one or more air bearing pucks, said one or more air bearing pucks bearing upon said top surface of said base and being displaced therefrom by an air gap;
   a plate being movably supported by said one or more air bearing pucks with said plate thereby being free to move in the X and Y directions and being free to rotate;

a first positioning stage, said first positioning stage comprising: a linear rail being fixed to said top surface of said base and being oriented in the Y direction; a puck being slidably mounted to said linear rail; and a linear motor to drive said slidable puck along said Y-direction linear rail;

a second positioning stage, said second positioning stage comprising: a linear rail mounted to said plate and being oriented in the X direction; a puck being slidably mounted to said X-direction linear rail; and a linear motor to drive said puck along said X-direction linear rail; said second positioning stage being mounted on top of said first positioning stage forming said compound positioning system; said second positioning stage being mounted on top of said first positioning stage by a rotary bearing being fixed to both said X-direction puck and to said Y-direction puck to permit a $\ominus$-rotation angle between said plate and said base, said rotation being driven by a rotary motor; and wherein said movement of said moveable plate is simultaneously corrected during movement for inaccuracies in the X and Y directions, and for θ rotational errors, and wherein said one or more air bearing pucks provide XY-plane support for said movable plate to maintain submicron Z-direction accuracy.

2. The compound positioning system according to claim 1 wherein said air gap is adjustable to create an amount of stiffness that provides a natural frequency of said compound positioning system resulting in quick vibration damping and small-magnitude transitional vibrations occurring from acceleration and deceleration of said movable plate.

3. The compound positioning system according to claim 2 further comprising X, Y, and $\ominus$ positioning feedback being provided to a motion controller; said $\ominus$ positioning feedback being provided by a rotary encoder attached to said rotary motor; said X positioning feedback being provided by a linear encoder at said X-direction linear motor; said Y positioning feedback being provided by a linear encoder attached to said puck of said Y-direction linear rail to travel along a linear encoder scale being fixed to said base.

4. The compound positioning system according to claim 3 wherein said movement of said movable plate is simultaneously corrected during movement by said motion controller precisely commanding travel by said linear motors and said rotary motors for accuracy in the X and Y linear directions and the $\ominus$ rotation direction, said corrected movement providing submicron translational error for movement comprising X-direction travel up to at least 1,000 millimeters, and Y-direction travel up to at least 5000 millimeters.

5. The compound positioning system according to claim 4 further comprising a second X-direction linear rail mounted to said plate with a respective slidable puck thereon and a respective linear motor, with said second X-direction slidable puck being positioned on top of a second Y-direction slidable puck on said Y-direction rail using a second rotary bearing, and wherein movement therebetween is provided by a second rotary motor, said first linear rail providing motion relative to said plate in the X1 direction and said second linear rail providing motion relative to said plate in the X2 direction.

6. The compound positioning system according to claim 5 wherein a positional inaccuracy of said substrate plate relative to said base is corrected using either said fixed X and Y coordinate system of said base or a moving X' and Y' coordinate system of said movable plate.

7. The compound positioning system according to claim 6 wherein a position of any point Q on said movable plate is determined by said motion controller according to forward kinematic equations comprising:

$$\ominus = A\ \text{TAN}\ [(X1-X2)/W_X]$$

$$X_P = (X1+x'p)\text{Cos}\ \ominus - y'p\ \text{Sin}\ \ominus$$

$$Y_P = (X1+x'p)\text{Sin}\ \ominus + y'p\ \text{Cos}\ \ominus + Y,$$

where $W_X$ is a distance between said X1 direction of travel of said first linear slide and said X2 direction of travel of said second linear slide.

8. The compound positioning system according to claim 7 wherein any point Q on said movable plate is positioned to coincide with any point P on said base, by said motion controller precisely commanding travel by said linear motors and said rotary motors to move according to inverse kinematic equations, said inverse kinematic equations comprising:

$$X1 = (X_P - X'q\ \text{Cos}\ \ominus\ Y'q\ \text{Sin}\ \ominus)/\text{Cos}\ \ominus$$

$$X2 = (X_P - X'q\ \text{Cos}\ \ominus + Y'q\ \text{Sin}\ \ominus)/\text{Cos}\ \ominus - W_X*\text{Tan}\ \ominus$$

$$Y = (Y_P - X'q\ \text{Sin}\ \ominus - Y'q\ \text{Cos}\ \ominus - Y0) - (XP - X'q\ \text{Cos}\ \ominus + Y'q\ \text{Sin}\ \ominus)*\text{Tan}\ \ominus.$$

9. The compound positioning system according to claim 8 wherein said forward and inverse kinematic calculations are made by said motion controller.

10. The compound positioning system according to claim 9 wherein when said positioning system is utilized for a high precision application of a substrate upon said movable plate, said travel is calibrated using a laser interferometer.

11. The compound positioning system according to claim 10 wherein said calibrated motion is saved within said motion controller and played back as a corrected target position for said movable plate.

12. The compound positioning system according to claim 5 wherein said one or more air bearing pucks comprise four air bearing pucks supporting said plate.

13. The compound positioning system according to claim 3 wherein said encoders are high resolution optical linear encoders.

14. The compound positioning system according to claim 13 wherein said movable plate comprises glass; and wherein said linear encoder scale comprises glass, said glass encoder scale compensating for any thermal expansion of said movable glass plate by automatically matching said any thermal expansion of said glass plate.

15. The improved compound positioning system according to claim 14 wherein said base comprises a precision flat granite base.

16. The compound positioning system according to claim 15 wherein said granite base is supported by one or more vibration isolation mounts.

17. The compound positioning system according to claim 1 wherein each of said X-direction linear motors comprises a ball screw drive.

18. An improved compound positioning system, for use in correcting errors associated with movement of large format substrates, said improved positioning system providing submicron translational error in the X, Y, and Z directions for a range of travel comprising X-direction travel up to at least 1,000 millimeters, Y-direction travel up to at least 5000 millimeters, and $\ominus$-rotation angles of up to 45 degrees, said compound positioning system comprising:

a base;

one or more air bearing pucks, said one or more air bearing pucks bearing upon said base and being displaced therefrom by an air gap, said air gap being adjustable to create a desired amount of stiffness; and wherein said desired amount of stiffness provides a natural frequency of said improved positioning system resulting in quick vibration damping and small-magnitude transitional vibrations occurring from acceleration and deceleration of said substrate plate;

a substrate plate, said substrate plate being moveably supported in an XY plane by said one or more air bearing pucks, said one or more air bearing pucks permitting X-direction and Y-direction translation, and Θ-angle rotation of said substrate plate relative to said base; said one or more air bearing pucks providing submicron XY-plane support for said substrate plate;

a first and a second X-direction linear slide, each of said first and second X-direction linear slides comprising:
 a linear rail being fixed to said substrate plate and being oriented in the X direction;
 a puck being slidably mounted to said X-direction linear rail;
 a linear motor being capable of driving said X-direction slidable puck relative to said X-direction linear rail to cause corresponding X-direction sliding motion of said substrate plate; and
 wherein said first linear slide permits X1 direction motion and said second linear slide permits X2 direction motion;

a Y-direction linear slide, said Y-direction linear slide comprising:
 a linear rail being fixed to said base and being oriented in the Y direction;
 a first and a second puck being slidably mounted to said Y-direction linear rail;
 a magnet track being attached to said base and oriented in the Y direction; and
 at least one linear motor coil being attached to one of said first and second Y-direction slidable pucks; said linear motor coil being capable of moving along said magnet track to cause corresponding Y-direction sliding motion of said one of said slidable pucks;

a first and a second rotary bearing, said first and second rotary bearings being mounted between said Y-direction slidable pucks and a respective one of said first and second X-direction slidable pucks, said first and second rotary bearings permitting Θ-angle pivoting of said X-direction slidable pucks relative to said respective Y-direction linear slides;

a first and second rotary motor, said first and second rotary motors driving a respective one of said first and second rotary bearings to cause said Θ-angle pivoting at each of said first and second X-direction linear slides;

a motion controller; said motion controller controlling said linear motors of said first and second X-direction linear slides and said first and second rotary motors;

X, Y, and Θ positioning feedback being provided to said motion controller; said Θ positioning feedback being provided by a rotary encoder attached to each of said rotary motors; said X positioning feedback being provided by a linear encoder at each of said linear motors; said Y positioning feedback being provided by a linear encoder attached to either of said first and second pucks of said Y-direction linear rail to travel along a linear encoder scale being fixed to said base; and wherein said travel of said substrate plate is simultaneously corrected during motion by said motion controller for accuracy in the X and Y linear directions and Θ rotation direction to provide submicron translational error for a range of travel of said substrate plate.

19. The improved positioning system according to claim 18 wherein a positional inaccuracy of said substrate plate relative to said base is corrected using either said fixed X and Y coordinate system of said base or a moving X' and Y' coordinate system of said substrate plate.

20. The improved positioning system according to claim 19 wherein said system corrects said positional inaccuracy of said substrate plate by said motion controller precisely commanding travel by said linear motors and said rotary motors.

21. The improved positioning system according to claim 20 wherein a position of any point Q on said substrate plate is determined using said X, Y, and θ positioning feedback according to forward kinematic equations comprising:

$$\Theta = A\ \text{TAN}\ [(X1-X2)/W_X]$$

$$X_P = (X1+x'p)\cos\Theta - y'p\sin\Theta$$

$$Y_P = (X1+x'p)\sin\Theta + y'p\cos\Theta + Y,$$

where $W_X$ is a distance between said X1 direction of travel of said first linear slide and said X2 direction of travel of said second linear slide.

22. The improved positioning system according to claim 21 wherein any point Q on said substrate plate is positioned to coincide with any point P on said substrate base, with said substrate plate being oriented at an angle Θ, by said motion controller precisely commanding travel by said linear motors and said rotary motors to move according to inverse kinematic equations, said inverse kinematic equations comprising:

$$X1 = (X_P - X'q\cos\Theta - Y'q\sin\Theta)/\cos\Theta$$

$$X2 = (X_P - X'q\cos\Theta + Y'q\sin\Theta)/\cos\Theta - W_X * \tan\Theta$$

$$Y = (Y_P - X'q\sin\Theta - Y'q\cos\Theta - Y0) - (XP - X'q\cos\Theta + Y'q\sin\Theta) * \tan\Theta.$$

23. The improved positioning system according to claim 22 wherein said forward and inverse kinematic calculations are made by said motion controller.

24. The improved positioning system according to claim 23 wherein when said positioning system is utilized for a high precision application of a substrate upon said substrate plate, said travel is calibrated using a laser interferometer.

25. The improved positioning system according to claim 24 wherein said calibrated motion is saved within said motion controller and played back as a corrected target position for said substrate plate.

26. The improved positioning system according to claim 25 wherein said base comprises a precision flat granite base.

27. The improved positioning system according to claim 26 wherein said granite base is supported by one or more vibration isolation mounts.

28. The improved positioning system according to claim 27 wherein each of said linear encoders comprise a high resolution optical linear encoder.

29. The improved positioning system according to claim 28 wherein said substrate plate comprises glass; and wherein said linear encoder scale comprises glass, said glass encoder scale compensating for any thermal expansion of said large glass substrate plate by automatically matching said any thermal expansion of said glass substrate plate.

30. The improved positioning system according to claim 29 wherein said linear motor drive comprises a ball screw drive.

* * * * *